Dec. 17, 1968    R. D. HOUK    3,416,390
CONTROL DEVICE FOR LOCKING A SHAFT AGAINST AXIAL TRANSLATION
Filed March 22, 1967
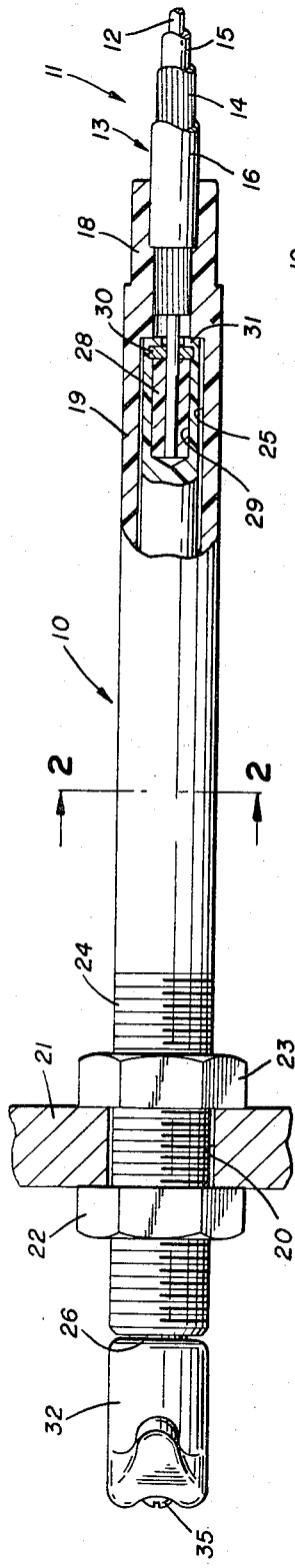
FIG. 1
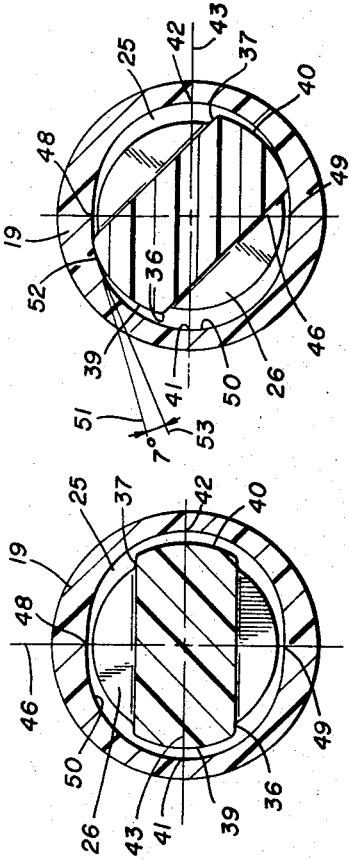
FIG. 3
FIG. 2
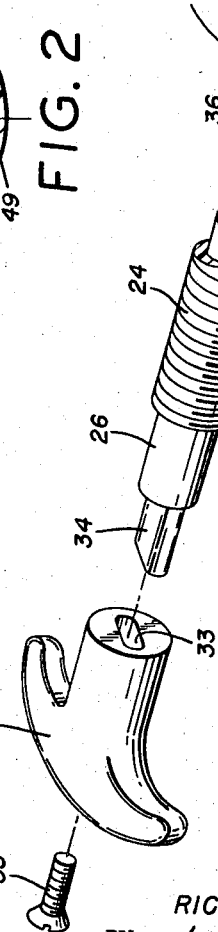
FIG. 4
INVENTOR.
RICHARD D. HOUK
BY Hamilton & Cook
ATTORNEYS United States Patent Office 3,416,390
Patented Dec. 17, 1968

3,416,390
CONTROL DEVICE FOR LOCKING A SHAFT
AGAINST AXIAL TRANSLATION
Richard D. Houk, Stow, Ohio, assignor to Morse Controls
Inc., Hudson, Ohio, a corporation of Ohio
Filed Mar. 22, 1967, Ser. No. 625,193
2 Claims. (Cl. 74—531)

ABSTRACT OF THE DISCLOSURE

A locking device primarily adapted for the core of a push-pull control cable. The core is secured to a control shaft axially slidable in a bore of generally elliptic transverse section which extends longitudinally through a sleeve-like housing. At least a portion of the control shaft presents diametrically opposed, curved surfaces on locking lugs of greater diameter than the shaft itself. These curved surfaces permit the shaft to slide axially of the housing when oriented in the plane of the major, or transverse, axis of the elliptic bore, but lockingly wedge against the generally elliptic surface of the bore when turned toward the plane of the minor, or conjugate, axis to prevent axial translation of the control shaft.

Background of the invention

Push-pull cables are generally well known to the art as devices having a core element capable of transmitting mechanical motion in either direction when at least the ends of the cable casing are satisfactorily clamped in position. Push-pull cables, being flexible, are particularly suitable for installations where the cable is required to extend through a number of bends between a control station and a remote controlled station. Such cables are constructed to have a core slidably received in a supporting casing and are commonly utilized in conjunction with such devices as throttle and brake controls.

In many such installations the control handle is connected directly to the core. For such use it is often necessary, or at least desirable, that the core be selectively lockable against movement other than when desired. For example, when the core is connected to a spring loaded throttle, a desired setting thereof cannot be maintained unless the core is restrained against the force of the spring.

Similarly, if the control cable is used to actuate a brake, such as an emergency brake, the core must be readily lockable in any number of different positions without fear of inadvertent release. Moreover, for such applications the amount of axial travel required of the core may vary from installation to installation, or even between successive applications in any given installation.

Heretofore, several known control devices have been employed in an attempt to provide such results. Probably the earliest attempt to employ a lockable control shaft secured to the control cable core required that the shaft be mounted between spaced apart support bearings. A lug extended radially outwardly of the shaft between the support bearings, and rotation of the shaft forced the lug against a housing so that the locking action constituted the three point contact consisting of the two bearings and the lug therebetween. This construction had several inherent disadvantages, the greatest being that the length of travel which could be afforded thereby was severely hampered by the fact that as the span between the bearings increased, the less reliable was the locking action since the increased span for the shaft necessitated by the increase in the span between bearings resulted in a flexibility of the shaft which permitted it quite easily to unlock upon vibration.

In order to alleviate these difficulties several complex arrangements have been advanced. One such construction requires that the operating shaft be of biconvex cross section with the opposed arcs having different radii. This biconvex shaft is axially slidable in a cylindrical bore, the radius of which is equal to the radius of one arc on the biconvex shaft but of lesser magnitude than the radius of the second arc. A locking lug is required to extend radially inwardly of the cylindrical bore, the lug acting as a cam against that arc having a radius equal to that of the bore to wedge the opposed intersections of the curves defining the cross section of the shaft against the surface of the bore upon partial rotation of the shaft. The precision required in constructing this device mitigates against its general acceptance.

Other attempts to refine such a control have utilized a cylindrically bored operating sleeve axially slidable in a cylindrically bored housing. In this construction a control shaft is received within the bore of the operating sleeve, and the control shaft is provided with a cam projection for forcing a roller into and out of engagement with the housing through a radial opening in the operating sleeve. The multiplicity of parts required for this construction makes it too expensive to manufacture and too subject to fouling.

Summary of the invention

It is therefore an object of the present invention to provide a core locking mechanism particularly suited for a push-pull cable in which the locking operation is easily effected by a construction which is readily adaptable to a variety of cable sizes and which is uncomplicated and inexpensive to manufacture and install.

It is another object of the present invention to provide a core locking device, as above, in which the locking action is undiminished by the accommodation of even exceptionally long core displacement and at the same time is resistant to vibration.

These and other objects which will become apparent from the following specification are accomplished by means hereinafter described and claimed.

In general, a control device according to the concept of the present invention utilizes a shaft having at least a pair of diametrically opposed locking lugs, the arcuate outer surfaces of which extend radially outwardly of the shaft. The control shaft is received within a generally elliptic bore which extends longitudinally of the housing, the control shaft being axially slidable therein when the lugs are oriented within the plane of the major, or transverse, axis of the generally elliptic bore. However, when the control shaft is partially rotated the curved surfaces on the locking lugs wedge against the interior surfaces of the generally elliptic bore to lock the control shaft against axial translation.

One preferred embodiment is shown by way of example in the accompanying drawings and described in detail without attempting to show all of the various forms and modifications in which the invention might be embodied; the invention being measured by the appended claims and not the details of the specification.

Description of the drawings

FIG. 1 is a side elevation, partly broken away and partly in section, depicting a push-pull control cable operatively connected to a control device embodying the concept of the present invention for locking a shaft against axial translation;

FIG. 2 is an enlarged cross section taken substantially on line 2—2 of FIG. 1 depicting the mechanism in unlocked relation;

FIG. 3 is a view similar to FIG. 2 depicting the mechanism in locked relation; and FIG. 4 is an exploded perspective, partly broken away, depicting the relationship of the control shaft to the sleeve-like housing in which it is received.

Description of a preferred embodiment

Referring more particularly to the drawings, the subject control device is indicated generally by the numeral 10 and is depicted as being operatively attached to a push-pull control cable assembly 11. A push-pull control cable assembly 11 includes the core 12 and the casing 13 in which the core is reciprocably slidable.

The prior art knows many casing constructions, one of which is depicted environmentally herein and comprises a plurality of wires 14 contiguously laid in the form of a helical coil about the radially outer surface of an inner flexible tube 15, which extends the full length of the casing 13. An outer, flexible cover 16 encases the coil of wires 14 and extends along the entire casing to at least within a short distance from the end of the wires 14.

A fitting portion 18 of a tubular, sleeve-like, housing 19 is positioned over the end of the wires 14 and cover 16 and is securely attached thereto, as by swaging.

The housing 19 may be received directly through a suitable opening 20 such as shown in mounting bracket 21. Thus located a pair of positioning nuts 22 and 23 fitting the external threaded portion 24 of housing 19 may be secured against the opposed faces of the bracket 21 to fasten the device in the desired location.

A bore 25 of generally elliptic cross section extends longitudinally of the housing and receives the control shaft 26.

One end of the control shaft 26 is secured to the cable core 12, preferably to permit at least partial relative rotation therebetween. An exemplary construction is shown in FIG. 1. The end of the control cable 12 is swaged, or otherwise affixed, to a swivel cylinder 28, and the cylinder 28 is rotatably received within a hollowed cavity 29 in the end of the control shaft 26.

A positioning washer 30 engages the outer end of cylinder 28 to maintain it against axial displacement with respect to the control shaft 26 and minimize the frictional resistance which could result if the end crimp 31 which retains the washer 30 in cavity 29 were to engage the cylinder 28.

The opposite end of the control shaft 26 extends outwardly of the housing 19 and supports a handle 32 thereon. The T handle depicted is nonrotatably mounted on the control shaft 26, as by the longitudinal slot 33 in the handle 32 into which the flatted end 34 of the control shaft 26 is inserted. An anchor screw 35 extends through the handle and into the shaft 26 to prevent disengagement of the handle from the shaft.

Although the entire control shaft may be so formed, it is sufficient that at least a portion thereof be provided with opposed, radially extending lock lugs 36 and 37. The curved surfaces 39 and 40 presented by the diametrically opposed lugs are generally arcuate and spaced radially inwardly of the apogees 41 and 42, respectively, of the bore 25 so that the control shaft 26 may be freely translated axially of the bore so long as the lugs are oriented in the plane of the transverse axis 43 of the generally elliptic bore 25 and thus in juxtaposition with the apogees 41 and 42. The diameter of the generally arcuate surfaces 39 and 40 is therefore less than the span of the transverse axis 43 between apogees 41 and 42.

However, the diametric span between surfaces 39 and 40 is of greater magnitude than the span of the conjugate axis 46 between the perigees 48 and 49 so that upon rotation of the control shaft the surfaces 39 and 40 are forced into engagement with opposed portions of the interior surface 50 of bore 25 between the apogees and perigees.

It must be understood that it is not critical that the bore be an exact ellipse nor, for that matter, that the surfaces 39 and 40 be exactly arcuate. They are, however, generally elliptic and generally arcuate, respectively, it being necessary for secure locking engagement only that the degrees of curvature of the bore 25 and the diametric surfaces 39 and 40, at their point of locking contact, differ by no more than seven (7) degrees.

Thus, as shown in FIG. 3, the line 51 tangent to the generally elliptic surface 50 of bore 25 at contact point 52 must diverge from the line 53 tangent to the generally arcuate surface 39 at no more than seven (7) degrees. The degree of curvature of said bore 25 is thus less than the degree of curvature of said arcuate surfaces 39 and 40 at the point said elliptic bore is lockingly engaged by said arcuate surfaces. As pictured, the degree of curvature differs by the maximum seven (7) degrees.

With this construction a rotative wedging force of a few ounces applied to handle 32 provides an effective axial lock for hundreds of pounds applied to the cable core 12. The advantages of this construction are now manifestly apparent and the objects of the invention have therefore been accomplished.

I claim:

1. A control device for selectively locking a shaft against axial translation throughout its range of movement comprising, a housing with a bore therethrough, said bore being of generally elliptic cross section with transverse and conjugate axes, the shaft having opposed locking lugs extending radially of said shaft and presenting diametric, generally arcuate, surfaces, the diameter of said generally arcuate surfaces being less than the span of said transverse axis to permit axial translation of said shaft when the lugs are oriented in the plane of said transverse axis, the said diameter being greater than the span of said conjugate axis so that said lugs lockingly wedge against the surface of said bore to preclude axial translation of said shaft when said lugs are rotated toward the plane of said conjugate axis.

2. A control device, as set forth in claim 1, in which the deree of curvature of said elliptic bore, at least at the point at which it is lockingly engaged by the said arcuate surfaces, is at least seven degrees less than the degree of curvature of said arcuate surfaces.

References Cited

UNITED STATES PATENTS

| 1,630,213 | 5/1927 | Petry | 74—502 |
| 2,448,968 | 9/1948 | Franck | 74—502 |
| 2,496,931 | 2/1950 | Brouse | 74—502 |
| 2,502,780 | 4/1950 | Dreffein | 74—531 X |

DONLEY J. STOCKING, Primary Examiner.

L. H. GERIN, Assistant Examiner.

U.S. Cl. X.R.

74—502; 287—126